United States Patent
Reinhart et al.

(10) Patent No.: US 7,926,819 B2
(45) Date of Patent: Apr. 19, 2011

(54) SEALS FOR TRANSMISSION DRIVE MOTORS

(75) Inventors: Timothy J. Reinhart, Brownsburg, IN (US); Gregory W. Kempf, Avon, IN (US); William S. Reed, Greenfield, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/197,813

(22) Filed: Aug. 25, 2008

(65) Prior Publication Data

US 2010/0044973 A1 Feb. 25, 2010

(51) Int. Cl.
*F16J 15/12* (2006.01)

(52) U.S. Cl. ........ 277/649; 277/562; 277/574; 277/651; 277/637

(58) Field of Classification Search .................. 277/562, 277/437, 572–575, 649, 651, 563, 637
See application file for complete search history.

(56) References Cited

U.S. PATENT DOCUMENTS

| | | | | |
|---|---|---|---|---|
| 2,191,044 A * | 2/1940 | Seligman | ...... | 165/167 |
| 2,697,623 A * | 12/1954 | Mosher | ...... | 277/573 |
| 2,873,153 A * | 2/1959 | Haynie | ...... | 384/484 |
| 2,896,432 A * | 7/1959 | Hempel | ...... | 464/131 |
| 3,200,615 A * | 8/1965 | Stokely | ...... | 464/14 |
| 3,306,683 A * | 2/1967 | Hans | ...... | 384/486 |
| 3,326,562 A * | 6/1967 | Hans | ...... | 277/502 |
| 3,425,758 A * | 2/1969 | Scheifele | ...... | 384/482 |
| 3,440,122 A * | 4/1969 | McCormick | ...... | 156/329 |
| 3,843,139 A * | 10/1974 | Messenger | ...... | 277/573 |
| 3,989,259 A * | 11/1976 | Lorenz et al. | ...... | 277/574 |
| 4,211,152 A * | 7/1980 | Colletti et al. | ...... | 92/168 |
| 4,226,426 A * | 10/1980 | Messenger | ...... | 277/353 |
| 4,427,206 A * | 1/1984 | Sugiyama | ...... | 277/568 |
| 4,525,082 A * | 6/1985 | Brandenstein et al. | ...... | 384/138 |
| 4,932,923 A * | 6/1990 | Thompson | ...... | 464/131 |
| 4,949,981 A * | 8/1990 | Nagashima | ...... | 277/573 |
| 5,080,157 A * | 1/1992 | Oerter | ...... | 152/417 |
| 5,174,839 A * | 12/1992 | Schultz et al. | ...... | 152/415 |
| 5,199,718 A * | 4/1993 | Niemiec | ...... | 277/552 |
| 5,326,112 A * | 7/1994 | Paykin | ...... | 277/575 |
| 5,588,915 A * | 12/1996 | Smith | ...... | 464/14 |
| 5,597,356 A * | 1/1997 | Rieder | ...... | 464/131 |
| 5,611,548 A * | 3/1997 | Dahlhaus | ...... | 277/574 |
| 6,059,663 A * | 5/2000 | Jones et al. | ...... | 464/133 |
| 6,077,166 A * | 6/2000 | Reynolds | ...... | 464/133 |
| 6,095,925 A * | 8/2000 | Smith | ...... | 464/131 |
| 6,367,810 B1 * | 4/2002 | Hatch | ...... | 277/551 |
| 6,796,860 B1 * | 9/2004 | Takahashi | ...... | 440/88 L |
| 7,465,100 B2 * | 12/2008 | Matsui | ...... | 384/486 |
| 2008/0217865 A1 * | 9/2008 | Sedlar et al. | ...... | 277/572 |

* cited by examiner

*Primary Examiner* — Alison K Pickard

(57) ABSTRACT

A seal for use between the housing of an automatic transmission and the housing (can) of a transmission drive motor is disposed at each end of the drive motor housing. The seal includes a preferably metal annulus having inner and outer elastomeric ribbed seals secured thereto. The annulus, which defines a non-hardened "S" shape in cross section, maintains the shape and strength of the seal and the ribbed inner seal provides a fluid tight seal with the motor housing while the ribbed outer seal provides a fluid tight seal with the transmission housing.

13 Claims, 4 Drawing Sheets

SEALS FOR TRANSMISSION DRIVE MOTORS

FIELD

The present disclosure relates to fluid tight seal structures and more particularly to fluid tight seals for installation between a drive motor housing and a housing of an automatic transmission.

BACKGROUND

The statements in this section merely provide background information related to the present disclosure and may or may not constitute prior art.

Modern passenger car and truck hybrid automatic transmissions frequently employ high torque electric motors to act as the sole energy source in certain operational modes and to operate in conjunction with a gasoline, Diesel or flexible fuel engine in other operational modes. Because these electric motors generate significant mechanical power for lengthy periods of time while consuming corresponding quantities of electrical power, they generate significant amounts of heat. In order to maintain a suitable, low operating temperature, it is necessary to remove such heat, typically by circulation of a heat transfer medium around the motor housing. Given the availability of transmission fluid, its system for circulation and heat rejection and its acknowledged heat transfer function, it is the obvious general solution to this requirement.

Because of the presence of pressurized or unpressurized moving fluid nearly everywhere within an automatic transmission, a first solution might appear to be simply exposing the motors to fluid circulating in the transmission. In reality, such fluid circulation at any given location within the transmission may vary widely depending upon the current operating state of the transmission and compromise cooling of the motor under certain conditions. It is thus apparent that a controlled, dedicated flow of transmission fluid to cool the motor is desirable.

However, due to the importance of maintaining relatively cool motor temperatures under all operating conditions with large motors occupying much or all of the transmission cross section, and the need to both positively provide fluid flow and control the volume of fluid flow, the choice to utilize a dedicated flow of transmission fluid for cooling creates a new array of engineering challenges. A first challenge relates to the fact that the motors may occupy all or a significant portion of the cross section of the transmission. This creates difficulties relating to fluid distribution to and within the motor. One solution to this challenge is to provide pressurized fluid to an annular passageway disposed between the motor housing and the inside of the transmission housing. Radial ports in the motor housing direct fluid to motor components such as the windings to absorb and carry away heat. A related challenge involves providing a secure, fluid tight seal between the transmission housing and motor housing so that a consistent, controlled flow of transmission fluid through the motor and its windings can be achieved.

One prior art approach to achieving a seal between a transmission and a drive motor housing utilizes O-rings disposed in channels extending about the circumference of the motor housing that engage complementarily located and configured circular shoulders or surfaces in the transmission housing. While this arrangement provides an acceptable seal, it is subject to assembly variations. For example, since the O-rings are installed on the outside of the motor housing, they are subject to being accidentally dislodged before or during mounting of the motor. Additionally, if an O-ring comes in contact with, for example, a sharp edge of the transmission housing during mounting of the motor, minor and possibly undetected damage to the O-ring can occur, resulting in initial or premature seal failure. Additionally, verification that the O-ring is assembled is very difficult due to its small size relative to the motor assembly. This precludes use of a vision system to ensure the O-ring is in place prior to assembly into the main housing.

From the foregoing brief review of the prior art of drive motor/transmission seal technology, it is apparent that improvements to this art are desirable.

SUMMARY

The present invention provides an improved seal between the housing of an automatic transmission and the housing (can) of a transmission drive motor. The seal, one of which is disposed at each end of the drive motor housing, includes a metal annulus having inner and outer elastomeric ribbed seals bonded thereto. The metal annulus, which defines a non-hardened "S" shape in cross section, maintains the shape and strength of the seal and the ribbed inner seal provides a fluid tight seal against the motor housing while the ribbed outer seal provides a fluid tight seal against the transmission housing. In pre-assembly configuration, rather than being installed on the outside of the motor housing, the motor seals according to the present invention are installed into the transmission housing where they are protected against damage and the drive motor is then installed into the transmission. The motor housing seal according to the present invention provides improved ease and certainty of correct installation as well as reduced likelihood of damage to the seal during installation, thereby reducing subsequent failures and service.

Thus it is an object of the present invention to provide a seal for disposition between the housing of an electric motor and the housing of an automatic transmission.

It is a further object of the present invention to provide a seal for disposition between the outside of a housing of an electric motor and the inside of a housing of an automatic transmission.

It is a still further object of the present invention to provide an annular seal for disposition between the housing of an electric motor and the housing of an automatic transmission having a metal ring and resilient sealing portions bonded to the ring.

It is a still further object of the present invention to provide a seal for disposition between the housing of an electric motor and the housing of an automatic transmission having a metal ring and resilient ribbed portions bonded to the ring.

It is a still further object of the present invention to provide an annular seal for disposition between the outside of a housing of an electric motor and the inside of a housing of an automatic transmission having a metal ring and resilient ribbed portions bonded to the ring.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
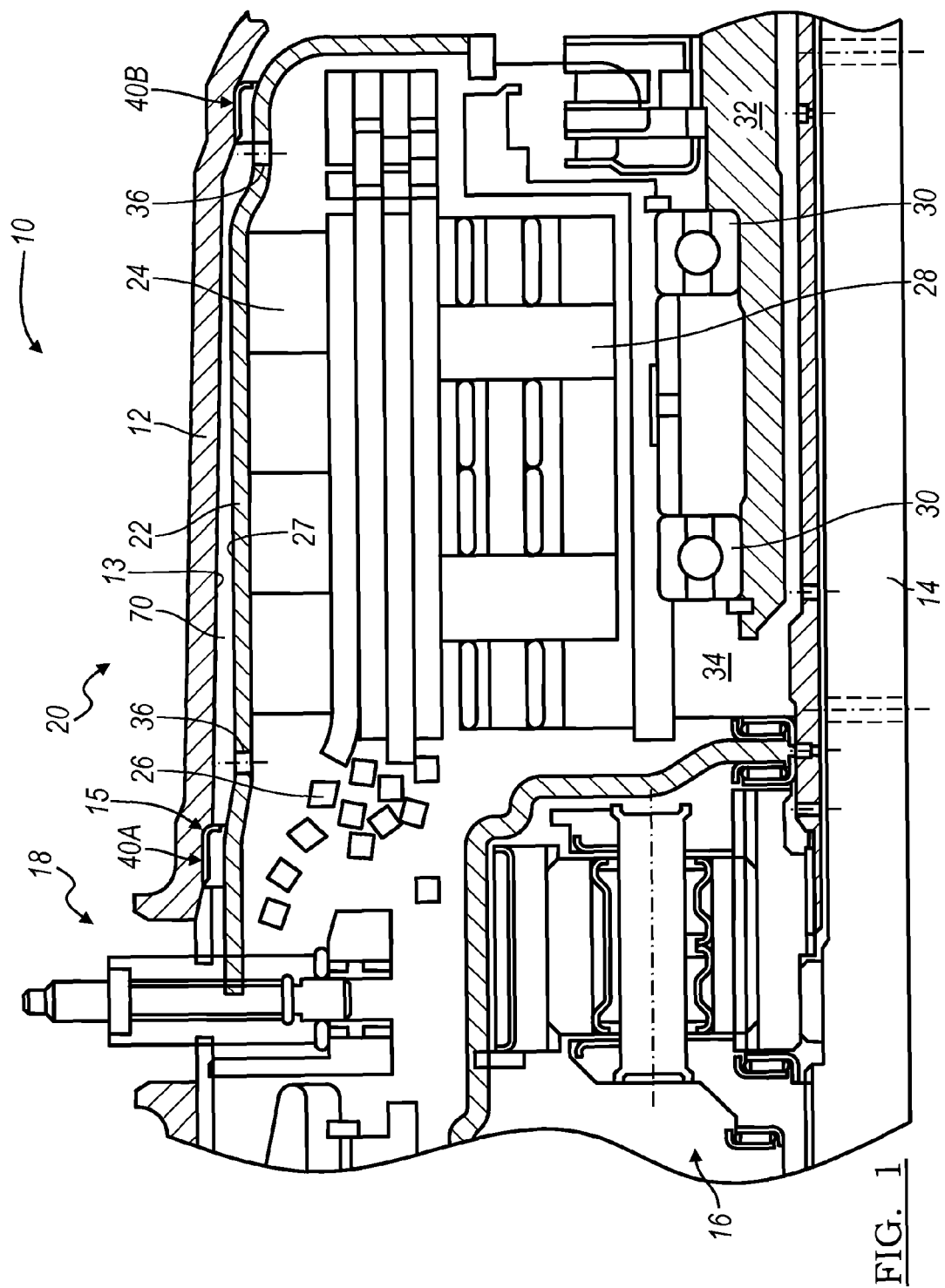
FIG. 1 is a fragmentary, side elevational view of an automatic transmission incorporating the present invention.

With reference to FIG. 1, a portion of an automatic vehicular transmission is illustrated and designated by the reference number 10. The automatic transmission 10 includes a typically cast, metal housing 12 having an inner cylindrical surface 13. A shoulder 15 representing a sloped or angled portion of the inner cylindrical surface 13 of the housing 12 is also situated along the inner cylindrical surface 13. The housing 12 supports, positions and protects various internal components such as an input shaft (not illustrated), a main output shaft 14, one or more planetary gear assemblies 16 (one of which is illustrated), a plurality of electrical feed-throughs or connectors 18 (one of which is illustrated), an electric motor assembly 20 and a hydraulic vane or gerotor pump (not illustrated). It will be appreciated that although only one electric motor assembly 20 is illustrated in the automatic transmission 10, more than one may be incorporated therein and the present invention is equally suitable for use with additional electric motor assemblies.

Figure 2:
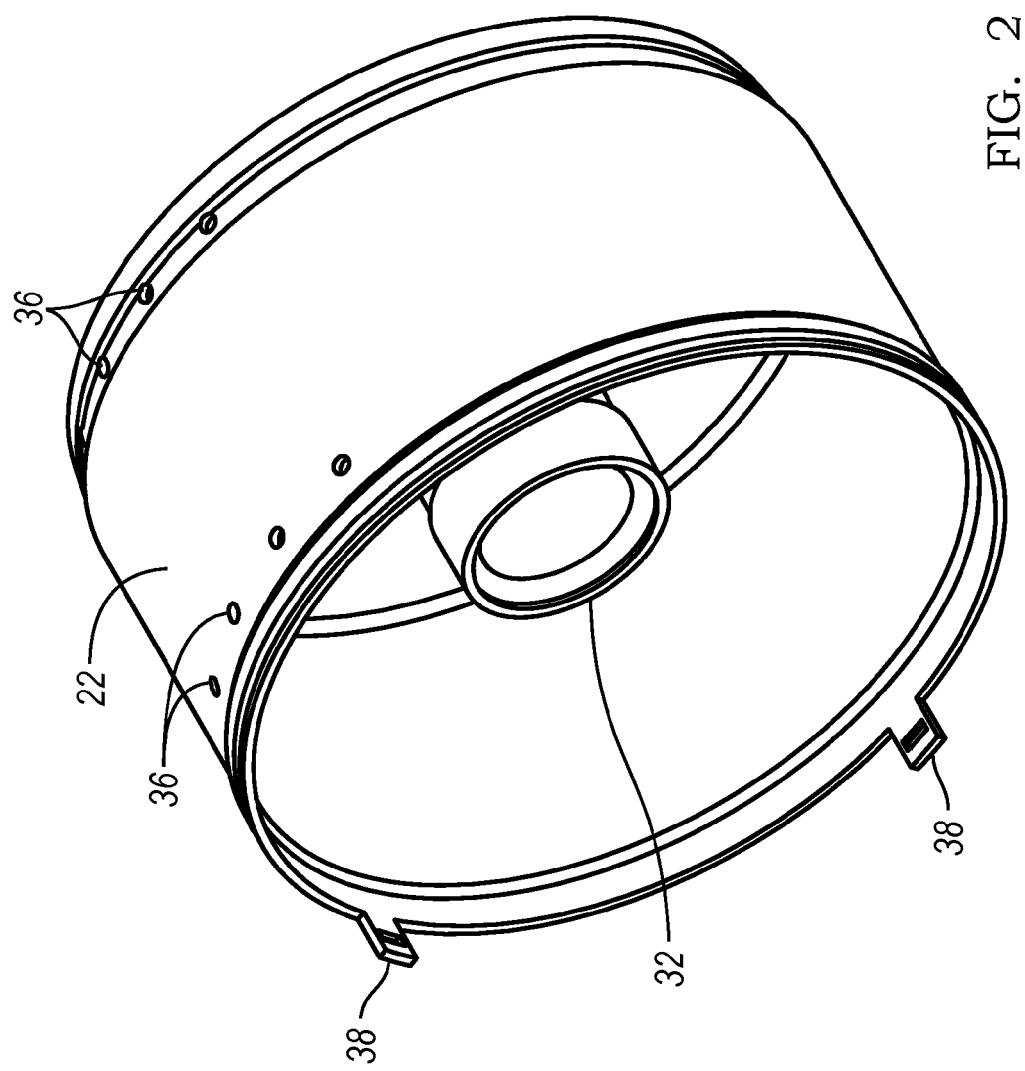
FIG. 2 is a perspective view of an electric motor housing having front and rear seals according to the present invention.

Referring now to FIGS. 1 and 2, the electric motor assembly 20 includes a generally tubular or cylindrical housing 22 which encircles a stator 24 having electrical field windings 26. The housing 22 includes an outer cylindrical surface 27. The inner cylindrical surface 13 of the housing 12 of the transmission 10 surrounds the outer cylindrical surface 27 of the housing 22. Rotatably disposed within the housing 22 and the stator 24 is a rotor 28 which is supported upon a pair of anti-friction support devices such as ball bearing assemblies 30. The ball bearing assemblies are, in turn, supported on a tubular member or bearing support 32 which is connected with a welded joint to the cylindrical motor housing 22. The rotor 28 is coupled to the main shaft 14 by an internally and externally splined hub 34 or similar component.

The cylindrical motor housing 22 includes a plurality of radially oriented lubrication passageways or apertures 36 arranged in front and rear circumferential arrays at the upper portion of the housing 22. The cylindrical motor housing 22 also includes two or more locating tabs or projections 38 that engage complementarily arranged slots or recesses (not illustrated) within the automatic transmission 10. The slots and projections 38 are dimensionally related to ensure that the cylindrical motor housing 22 is oriented properly, that is, with the lubrication passageways or apertures 36 at the top of the automatic transmission 10 when it is installed therein.

Figure 3:
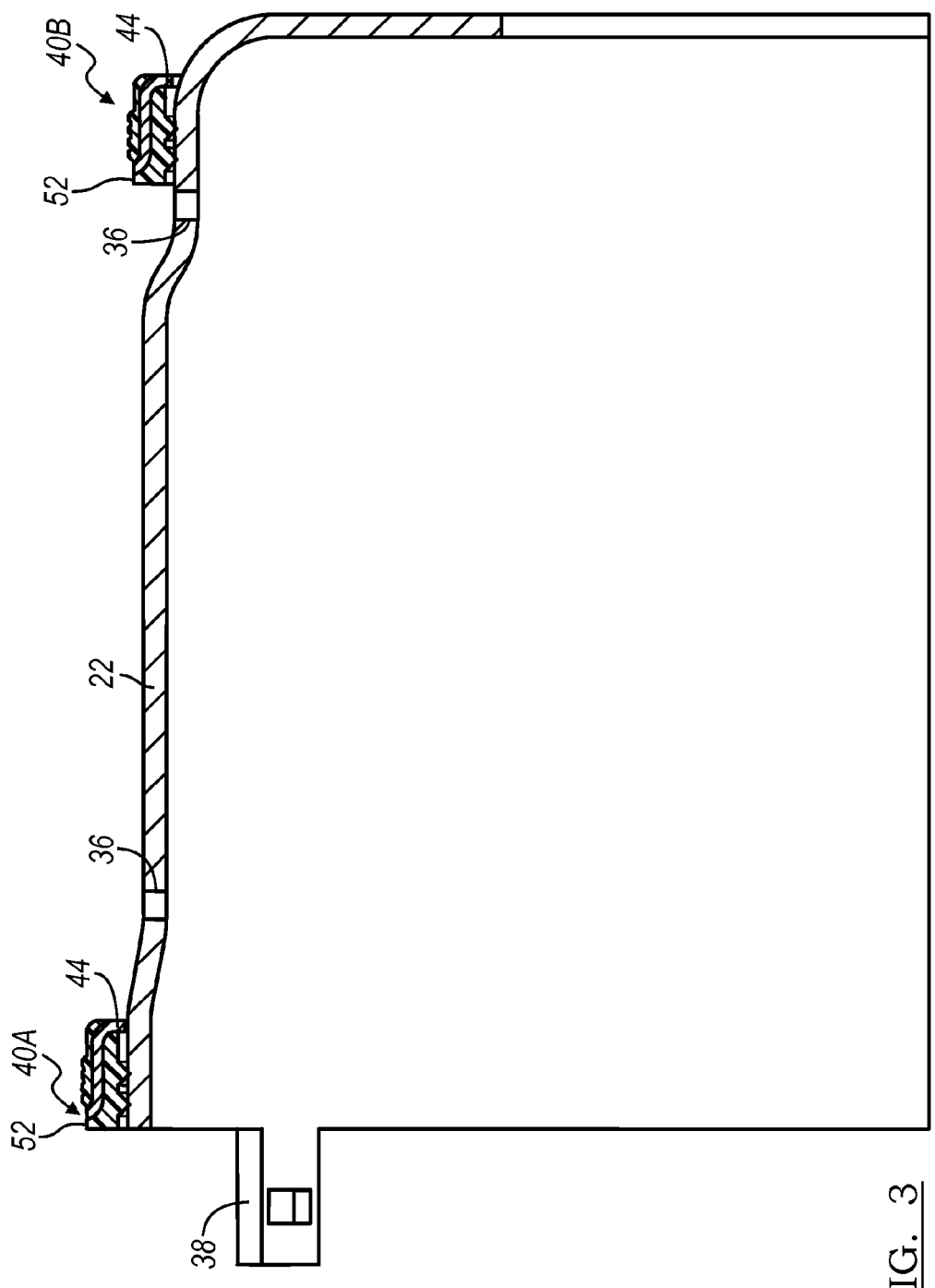
FIG. 3 is an enlarged, side elevational view of a electric drive motor housing for an automatic transmission having front and rear seals according to the present invention.

Referring now to FIGS. 1, 2 and 3, about the outer surface 27 of the motor housing 22 are disposed a pair of seals 40 according to the present invention. A front or first seal 40A is located along a front or first edge of the cylindrical motor housing 22 outside the lubrication passageways 36 and a second or rear seal 40B is located along a second or rear edge of the cylindrical motor housing 22 also outside the lubrication passageways 36. Stated somewhat differently, the lubrication passageways or apertures 36 reside in an (axial) region between the front seal 40A and the rear seal 40B.

Figure 4:
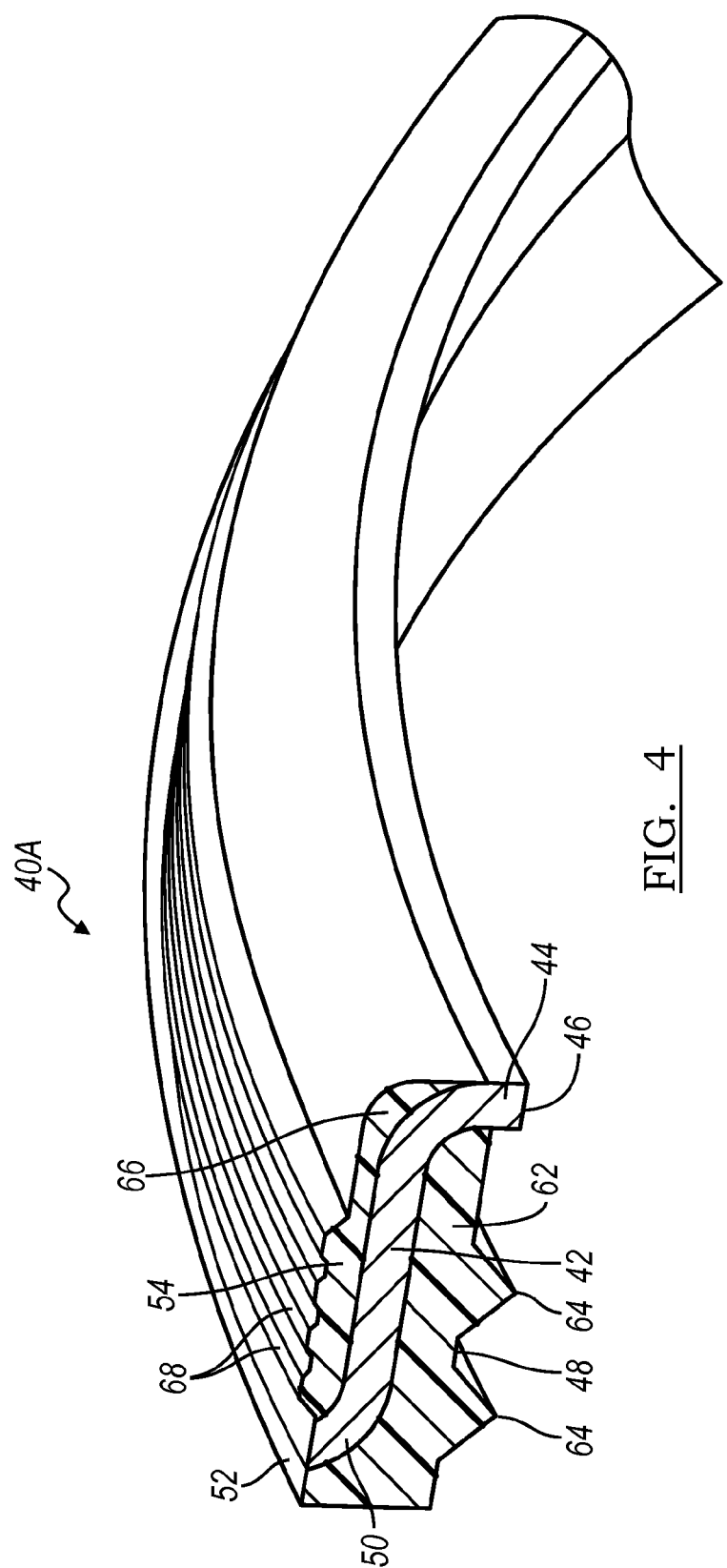
FIG. 4 is an enlarged perspective view of a control motor housing and seal according to the present invention.

Referring now to FIGS. 3 and 4, it should be appreciated that but for their distinct diameters, the front seal 40A and the rear seal 40B have an identical cross-section. Thus, in FIG. 4, only the front seal 40A is illustrated as the description applies with equal accuracy to the rear seal 40B. The front seal 40A includes a center metal band or annulus 42 that is formed into a non-hardened "S" shape having a first end 44 that is curved or formed inwardly at a right angle (90°) such that the first end face 46 of the annulus 42 is parallel to the axis of the cylindrical housing 22 and extends inwardly from the inner surface 48 of the annulus 42. Referring now to FIG. 1, the inwardly curved portion of the annulus 42 corresponds with the shoulder 15 of the housing 12 and seats the first end face 46 of the annulus parallel to the outer cylindrical surface 27 of the housing 22. The other or second end 50 of the annulus 42 is curved or formed outwardly such that the second end face 52 is also parallel to the axis of the cylindrical housing 22 but is substantially flush or co-planar with the outer surface 54 of the annulus 42. The shape of the metal band or annulus 42 in the seal 40A provides rigidity and dimensional stability to the seal 40A.

Molded in-situ or bonded to the inner surface 48 of the annulus 42 by any suitable bonding or fastening technique is a first resilient internal seal 62 of, for example, an elastomeric material having two or more ribs 64 which contact and seal against the outside of the cylindrical motor housing 22. Molded in-situ or bonded to the outer surface 54 of the annulus 42 by any suitable bonding or fastening technique is a second resilient internal seal 66 also of, for example, an elastomeric material having three or more ribs 68 which contact and seal against the inside surface of the transmission housing 12.

Inspection of FIG. 3 reveals that the seals 40A and 40B are oriented with the first end surfaces 46 and the first end faces 46 of the metal bands 42 remote from the open end of the cylindrical motor housing 22 and the second end surfaces 52 of the metal bands 42 nearer the open end of the cylindrical motor housing 22. Inspection of FIG. 4 reveals that the first end face 46 of the annulus 42 is preferably exposed because the bonding process requires a non-sealed portion of the metal band 42 for gating processes during fabrication and will assist properly locating the motor housing 22 whereas the second end face 52 of the annulus 42 is preferably covered or encased by a thin layer of the elastomeric material to ensure proper bonding of the elastomeric material to the metal band 42.

Returning to FIG. 1, It will be appreciated that the front seal 40A and the rear seal 40B define an annular cavity or region 70 that extends circumferentially about the motor housing 22 between it and the inside surface of the transmission housing 12. This circumferential region 70 is pressurized by the hydraulic pump of the automatic transmission 10 and hydraulic fluid flows into the circumferential region 70 at low pressure, through the lubrication passageways or apertures 36 and is directed by the apertures 36 and contacts the motor windings 26. Heat generated in the motor windings 26 is carried away by the hydraulic fluid and rejected to the atmosphere through a transmission fluid cooler (not illustrated).

The description of the invention is merely exemplary in nature and variations that do not depart from the gist of the invention are intended to be within the scope of the invention. Such variations are not to be regarded as a departure from the spirit and scope of the invention or the following claims.

What is claimed is:

1. A seal assembly for an automatic transmission, comprising in combination,
   a drive motor housing having an outer cylindrical surface;
   an automatic transmission housing having an inner cylindrical surface and a shoulder, wherein said inner cylindrical surface surrounds said outer cylindrical surface of said drive motor housing, and wherein said shoulder is a sloped portion of said outer cylindrical surface; and
   a seal having an annulus having an outer surface, an inner surface, a first end and a second end axially spaced from said first end, said first end having an inwardly curved portion and a first end face disposed at a distal end of the inwardly curved portion that is parallel to the drive motor housing, said second end having an outwardly curved portion, an outer seal secured to said outer surface and an inner seal secured to said inner surface, wherein said first end face is exposed and is a locating feature configured to locate said annulus between the seal and the outer surface of the drive motor housing,
   wherein said inwardly curved portion of said annulus corresponds with said shoulder of said automatic transmission housing to seat said first end face parallel to said outer cylindrical surface of said drive motor housing.

2. The seal assembly of claim 1 wherein said outer seal includes a plurality of ribs.

3. The seal assembly of claim 2 wherein said outer seal includes four ribs.

4. The seal assembly of claim 1 wherein said inner seal includes a plurality of ribs.

5. The seal assembly of claim 4 wherein said inner seal includes two ribs.

6. The seal assembly of claim 1 wherein said first end extends radially inwardly of said inner seal.

7. The seal assembly of claim 1 wherein said second end is covered by said outer seal.

8. A seal assembly for an automatic transmission, comprising, in combination,
   a drive motor housing having an outer cylindrical surface;
   an automatic transmission housing having an inner cylindrical surface, wherein said inner cylindrical surface surrounds said outer cylindrical surface of said drive motor housing; and
   an annulus having an outer surface, an inner surface, a first end and a second end axially spaced from said first end, said first end having an inwardly curved portion and a first end face, wherein said first end face is disposed parallel to said outer surface of said drive motor housing, and wherein said second end having an outwardly curved portion, an outer seal secured to said outer surface and an inner seal secured to said inner surface, and
   wherein said second end includes a second end face that is disposed parallel to said outer surface of said drive motor housing;
   wherein said first inwardly curved portion of said first end extends radially inwardly beyond said inner seal such that said first end face is exposed, and wherein said first end face is a locating feature configured to locate said annulus between said automatic transmission housing, and said outer cylindrical surface of said drive motor housing.

9. The drive motor seal of claim 8 wherein said outwardly curved portion is encased within said outer seal.

10. The drive motor seal of claim 8 wherein said first end face is disposed parallel to an axis of said annulus and wherein said first end face is extended radially inwardly beyond said inner seal.

11. The drive motor seal of claim 8 wherein said outer seal includes at least two ribs.

12. The drive motor seal of claim 8 wherein said inner seal includes at least two ribs.

13. A seal assembly for an automatic transmission comprising, in combination,
   a drive motor housing having a plurality of lubrication apertures and an outer cylindrical surface,
   an automatic transmission housing having an inner cylindrical surface, wherein said inner cylindrical surface surrounds said outer cylindrical surface of said drive motor housing; and
   a pair of annular seals disposed about said housing to define a circumferential flow passageway in communication with said apertures, each of said seals including a metal annulus having an outer surface, an inner surface, a first end and a second end axially spaced from said first end, said first end having an inwardly curved portion and a first end face disposed at a distal end of said inwardly curved portion, said second end having an outwardly curved portion, an outer seal secured to said outer surface and an inner seal secured to said inner surface, wherein said second end is encased in said outer seal;
   wherein said inner seal includes as least two inner ribs and said outer seal includes at least two outer ribs, and wherein said at least two outer ribs seal against the inner cylindrical surface of said transmission housing;
   wherein said first end face extends radially inwardly beyond said inner seal to provide a locating feature, and wherein said first end face is a locating feature configured to locate said annulus between said automatic transmission housing and said outer cylindrical surface of said drive motor housing.

* * * * *